(12) United States Patent
Anderson et al.

(10) Patent No.: US 10,303,683 B2
(45) Date of Patent: May 28, 2019

(54) TRANSLATION OF NATURAL LANGUAGE QUESTIONS AND REQUESTS TO A STRUCTURED QUERY FORMAT

(71) Applicant: International Business Machines Corporation, Armonk, NY (US)

(72) Inventors: Ryan R. Anderson, Kensington, CA (US); Joseph M. Kaufmann, Austin, TX (US); Lakshminarayanan Krishnamurthy, Round Rock, TX (US); Niyati Parameswaran, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 15/286,401

(22) Filed: Oct. 5, 2016

(65) Prior Publication Data
US 2018/0095962 A1    Apr. 5, 2018

(51) Int. Cl.
*G06F 17/30* (2006.01)
*G06F 16/2452* (2019.01)
(Continued)

(52) U.S. Cl.
CPC .... *G06F 16/24522* (2019.01); *G06F 16/2365* (2019.01); *G06F 16/243* (2019.01); *G06F 16/24578* (2019.01); *G06F 16/285* (2019.01)

(58) Field of Classification Search
None
See application file for complete search history.

(56) References Cited

U.S. PATENT DOCUMENTS 7,966,316 B2   6/2011   Cao et al.
8,301,438 B2   10/2012  Ferrucci et al.
(Continued)

OTHER PUBLICATIONS

Beauchemin, Bob, "Full text and Semantic Search in SQL Server 2008 and 2012", [online], retrieved on Sep. 8, 2016, from the Internet URL: https://channel9.msdn.com/Events/TechDays/Techdays-2012-the-Netherlands/2297 (2012).
(Continued)

*Primary Examiner* — Amresh Singh
(74) *Attorney, Agent, or Firm* — Diana R. Gerhardt; Jack V. Musgrove (57) ABSTRACT

A natural language query (NLQ) is translated to a structured data query (e.g., a SQL statement) by extracting entities from the NLQ and replacing them with generic variables to form a generic query. The generic query is associated with a structured question type which includes structured data variables using natural language classifiers (NLCs). Specific data is inserted in the structured question type in relation to the structured data variables based on the extracted entities to form the structured data query. An ensemble of NLCs trained with different ground truths can be used to yield multiple candidate question types. One of the candidate question types is selected based on confidence levels. The multiple NLCs can include an NLC which is optimized according to a focus of the generic query. For example, an NLC can be optimized for a specific data structure (such as SQL), or for comparative queries.

18 Claims, 6 Drawing Sheets

(51) Int. Cl.
  *G06F 16/28* (2019.01)
  *G06F 16/23* (2019.01)
  *G06F 16/2457* (2019.01)
  *G06F 16/242* (2019.01)

(56) References Cited

U.S. PATENT DOCUMENTS

| | | | |
|---|---|---|---|
| 8,666,730 | B2 | 3/2014 | Todhunter et al. |
| 8,744,837 | B2 | 6/2014 | Heo et al. |
| 9,348,893 | B2 | 5/2016 | Brown et al. |
| 2004/0162816 | A1* | 8/2004 | Irle .................. G06F 17/30286 |
| 2008/0235199 | A1 | 9/2008 | Li et al. |
| 2014/0006012 | A1 | 1/2014 | Zhou et al. |
| 2014/0163962 | A1 | 6/2014 | Castelli et al. |
| 2015/0339577 | A1 | 11/2015 | Waltinger |
| 2016/0140123 | A1 | 5/2016 | Chang et al. |
| 2016/0147737 | A1 | 5/2016 | Ryu et al. |
| 2016/0148612 | A1 | 5/2016 | Guo et al. |

OTHER PUBLICATIONS

Giordani, Alessandra, et al., "Semantic Mapping Between Natural Language Questions and SQL Queries via Syntactic Pairing", Proc. 14th Int'l. Conf. on Applications of Natural Language to Information Systems, pp. 207-221 (2009).

Database Administrators Stack Exchange, "Why did Microsoft kill "English Query" on SQL Server?", [online], retrieved on Sep. 8, 2016, from the Internet URL: http://dba.stackexchange.com/questions/12681/why-did-microsoft-kill-english-query-on-sql-server (2012).

Stack Overflow, "What happened with SQL English query?" [online], retrieved on Sep. 8, 2016, from the Internet URL: http://stackoverflow.com/questions/886502/what-happened-with-sql-english-query (2009).

Microsoft, "Semantic Search (SQL Server)", [online], retrieved on Sep. 8, 2016, from the Internet URL: https://msdn.microsoft.com/en-us/library/gg492075.aspx (2016).

Nihalani, Neelu, et al., "Natural Language Interface to Database using Semantic Matching", Int'l. Journal of Computer Applications, v. 31, n. 11, pp. 29-34 (2011).

National Institute of Standards and Technology, "Examples of SQL syntax", [online], retrieved on Oct. 3, 2016, from the Internet URL: http://www.itl.nist.gov/div897/ctg/dm/sql_examples.htm (1997).

Posevkin, Ruslan, et al., "Translation of natural language queries to structured data sources", 9th Int'l. Conf. on Application of Information and Communication Technologies, pp. 57-59 (2015).

\* cited by examiner

| # | Question | Type |
|---|---|---|
| 1 | How much did COMPANY spend between jan and July YEAR1? | SELECT TOP 1 SUM(SPEND) GROUP BY COMPANY WHERE DATE_RANGE |
| 2 | How much did COMPANY spend in YEAR1 - YEAR2 | SELECT TOP 1 SUM(SPEND) GROUP BY COMPANY WHERE DATE_RANGE |
| 3 | How much did COMPANY spend in first half of YEAR1? | SELECT TOP 1 SUM(SPEND) GROUP BY COMPANY WHERE DATE_RANGE |
| 4 | How much was spent by COMPANY between jan and july YEAR1 | SELECT TOP 1 SUM(SPEND) GROUP BY COMPANY WHERE DATE_RANGE |
| 5 | How much was spent by COMPANY in YEAR1 - YEAR1? | SELECT TOP 1 SUM(SPEND) GROUP BY COMPANY WHERE DATE_RANGE |
| 6 | What was COMPANY total expenditure between jan and july YEAR1? | SELECT TOP 1 SUM(SPEND) GROUP BY COMPANY WHERE DATE_RANGE |
| 7 | What was COMPANY total expenditure in YEAR1 - YEAR1? | SELECT TOP 1 SUM(SPEND) GROUP BY COMPANY WHERE DATE_RANGE |
| 8 | What was COMPANY total expenditure in second half YEAR1? | SELECT TOP 1 SUM(SPEND) GROUP BY COMPANY WHERE DATE_RANGE |
| 9 | What was total media spend by COMPANY between jan and july YEAR1? | SELECT TOP 1 SUM(SPEND) GROUP BY COMPANY WHERE DATE_RANGE |
| 10 | What was total media spend by COMPANY in YEAR1 - YEAR1 | SELECT TOP 1 SUM(SPEND) GROUP BY COMPANY WHERE DATE_RANGE |
| 11 | What was total media spend by COMPANY in second half of YEAR1? | SELECT TOP 1 SUM(SPEND) GROUP BY COMPANY WHERE DATE_RANGE |
| 12 | What was monthly spend by COMPANY for YEAR1? | SELECT TOP 1 SUM(SPEND) GROUP BY COMPANY WHERE DATE_RANGE DIVIDE BY MONTHS |
| 13 | What was monthly spend by COMPANY in MEDIA for YEAR1? | SELECT TOP 1 SUM(SPEND) GROUP BY COMPANY WHERE MEDIA AND DATE_RANGE DIVIDE BY MONTHS |
| 14 | How much did COMPANY spend in MEDIA between jan and july YEAR1 | SELECT TOP 1 SUM(SPEND) GROUP BY COMPANY WHERE INDUSTRY AND MEDIA AND DATA_RANGE |
| 15 | How much did COMPANY spend in MEDIA in first half of YEAR1 | SELECT TOP 1 SUM(SPEND) GROUP BY COMPANY WHERE INDUSTRY AND MEDIA AND DATA_RANGE |
| 16 | How much was spent by COMPANY in MEDIA between jan and july YEAR1 | SELECT TOP 1 SUM(SPEND) GROUP BY COMPANY WHERE INDUSTRY AND MEDIA AND DATA_RANGE |
| 17 | What was annual expenditure of COMPANY in MEDIA between jan and july YEAR1? | SELECT TOP 1 SUM(SPEND) GROUP BY COMPANY WHERE INDUSTRY AND MEDIA AND DATA_RANGE |
| 18 | What was COMPANY total expenditure in MEDIA between jan and july YEAR1? | SELECT TOP 1 SUM(SPEND) GROUP BY COMPANY WHERE INDUSTRY AND MEDIA AND DATA_RANGE |
| 19 | What was COMPANY total expenditure in MEDIA in YEAR1? | SELECT TOP 1 SUM(SPEND) GROUP BY COMPANY WHERE INDUSTRY AND MEDIA AND DATA_RANGE |

"Can you please tell me the total spent on television in China by IBM in the last quarter of 2015?"

natural language query

92

"What was TV_MEDIA in REGION by COMPANY between DATE1 and DATE2?"

generic query

94

"SELECT SUM(COST) FROM SPEND_TABLE WHERE COMPANY AND COUNTRY AND DATE_RANGE"

structured question type

96

"SELECT SUM(COST) FROM table_tv_media WHERE (COMPANY='IBM') AND (COUNTRY ='China') AND DATE_RANGE =('2015/09/01', '2015/12/31')"

structured data query

TRANSLATION OF NATURAL LANGUAGE QUESTIONS AND REQUESTS TO A STRUCTURED QUERY FORMAT

CROSS-REFERENCE TO RELATED APPLICATION

This application is related to U.S. patent application Ser. No. 15/286,413 entitled "USING MULTIPLE NATURAL LANGUAGE CLASSIFIERS TO ASSOCIATE A GENERIC QUERY WITH A STRUCTURED QUESTION TYPE" filed concurrently herewith, which is hereby incorporated.

BACKGROUND OF THE INVENTION

Field of the Invention

The present invention generally relates to natural language processing, and more particularly to a method of submitting a query to a structured data system such as a SQL database.

Description of the Related Art

As interactions between users and computer systems become more complex, it becomes increasingly important to provide a more intuitive interface for a user to issue commands and queries to a computer system. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may enter a natural language query in an Internet search engine, and the search engine intelligence can provide a natural language response which the user can hopefully understand. One example of an advanced computer system that uses natural language processing is the IBM Watson™ cognitive technology marketed by International Business Machines Corp.

Different technologies can converge to provide resources for NLP, such as speech-to-text conversion (voice recognition). A user can say something to a computer system or cellphone, and the voice signal captured by the microphone is analyzed according to a particular human language or dialect to produce a text input or query in a computer-readable form. Text analysis is known in the art pertaining to NLP and typically uses a text annotator program to search text and analyze it relative to a defined set of tags. The text annotator can generate linguistic annotations within the document to tag concepts and entities that might be buried in the text. A cognitive system can then use a set of linguistic, statistical and machine-learning techniques to analyze the annotated text, and extract key business information such as person, location, organization, and particular objects (e.g., vehicles), or identify positive and negative sentiment.

Natural language classifiers are commonly used in NLP systems to identify the type of discourse in connected text, e.g., a yes/no question, a content question, a statement, an assertion, etc. This service enables developers without a background in machine learning or statistical algorithms to create natural language interfaces for their applications. A natural language classifier (NLC) interprets the intent behind text and returns a corresponding classification with associated confidence levels. The return value can then be used to trigger a corresponding action, such as redirecting the request or answering a question. NLCs are typically tuned and tailored to short text (1000 characters or less) and can be trained to function in any domain or application. For example, the IBM Watson™ natural language classifier service applies deep learning techniques to make predictions about the best predefined classes for short sentences or phrases. Exemplary applications include responding to questions from users that would otherwise be handled by a live agent, categorizing text messages (SMS) as personal, work, or promotional, classifying tweets into a sets such as events, news, or opinions, and analyzing text from social media or other sources to determine whether it relates positively or negatively to an offering or service.

NLP can also involve relationship extraction, i.e., detecting semantic relations within a set of artifacts, typically from text or XML documents. Relations include the subject, action and object within sentences and how they are correlated. One useful relationship extraction tool is the AlchemyAPI™ technology marketed by International Business Machines Corp. That tool provides an application interface (API) capable of parsing sentences into subject, action and object form and then adding additional semantic information such as entity extraction, keyword extraction, sentiment analysis and location identification. Relation extraction can be used to automatically identify buying signals, key events and other important actions.

SUMMARY OF THE INVENTION

The present invention in at least one embodiment is generally directed to translation of a natural language query to a structured data query by extracting one or more entities from a natural language query, correlating at least one of the entities with a generic variable, replacing the entity in the natural language query with the generic variable to generate a generic query, associating the generic query with a structured question type which includes a structured data variable corresponding to the generic variable, and inserting specific data in the structured question type in relation to the structured data variable based on the at least one entity to form the structured data query. The associating can be carried out using a natural language classifier which classifies the generic query according to different structured question types. The generic variables can for example be a region, a company, a date range, or a spend amount. A gatekeeper NLC can be used to initially determine whether the natural language query is directed to a structured data system or a rank-and-retrieve system. In a specific implementation for SQL, the structured question type is a SQL shell. The structured data query can be validated to confirm that the structured data query complies with syntax requirements of a structured data system. Once translated, the structured data query can be submitted to the structured data system.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

FIG. 4 is a table showing generic (simplified) queries and corresponding SQL statements in accordance with one implementation of the present invention;

The use of the same reference symbols in different drawings indicates similar or identical items.

DESCRIPTION OF THE PREFERRED EMBODIMENT(S)

While humans are biased to asking questions in a natural language format, many of the answers to these questions reside inside data structures which cannot be accessed using a natural language query. Structured information in various guises has become ubiquitous across computing systems today. For example, databases are considered structured data systems, particularly relational databases. SQL (Structured Query Language) is a popular special-purpose programming language designed for managing data held in a relational database management system. A SQL system cannot understand a natural language question, so a user who does not know SQL cannot formulate an appropriate SQL statement to interrogate the system. Take for instance a user who wants to know the total sales of beer for the Pabst Blue Ribbon Brand in Canada for the third quarter of 2015. Such a user persona is one of a non-technical user who would like to communicate in natural language but would like to seek answers from a structured data set in a perfectly typical situation. Natural language to structured language conversion therefore emerges as a crucial requirement when building scalable question-and-answer systems with the requirement for methods and mechanisms that permit humans to ask questions and articulate ideas in natural language and then have machines to translate their natural language requests into syntactically correct organized queries.

Companies have experimented with and released products that seek to deliver English-to-structured queries, however, several issues remain to make such products feasible for wider use. There is often an inability to adequately comprehend user intent and goals through rationalized sense making. Rigidity around system configuration and tuning also make conceptualization of a structured data query difficult. Additionally, there is continued dependence on text rather than verbal input. It would, therefore, be desirable to devise an improved method of submitting a structured data query which makes more "dark data" easily accessible for the non-technical user, particularly via voice utterances or natural queries. It would be further advantageous if the method could provides real-time information through a portable framework for decision support, while lowering barriers to information throughout organization by opening up data sources and improving decision quality. These objectives can be achieved by leveraging APIs such as speech-to-text, relationship extraction and natural language classification for the translation of natural language questions and requests into structured queries as disclosed herein. In an illustrative implementation, a computer system receives the user's utterance, extracts various entities and replaces them with generic domain specific terms. This simplified utterance is analyzed to classify the query according to a particular structured data language such as SQL. Structured data variables in the SQL statement can then be replaced with specific data based on the extracted entities to form the structured data query. This approach has yielded results which exceed commercial requirements for natural query usage of structured data systems.

Figure 1:
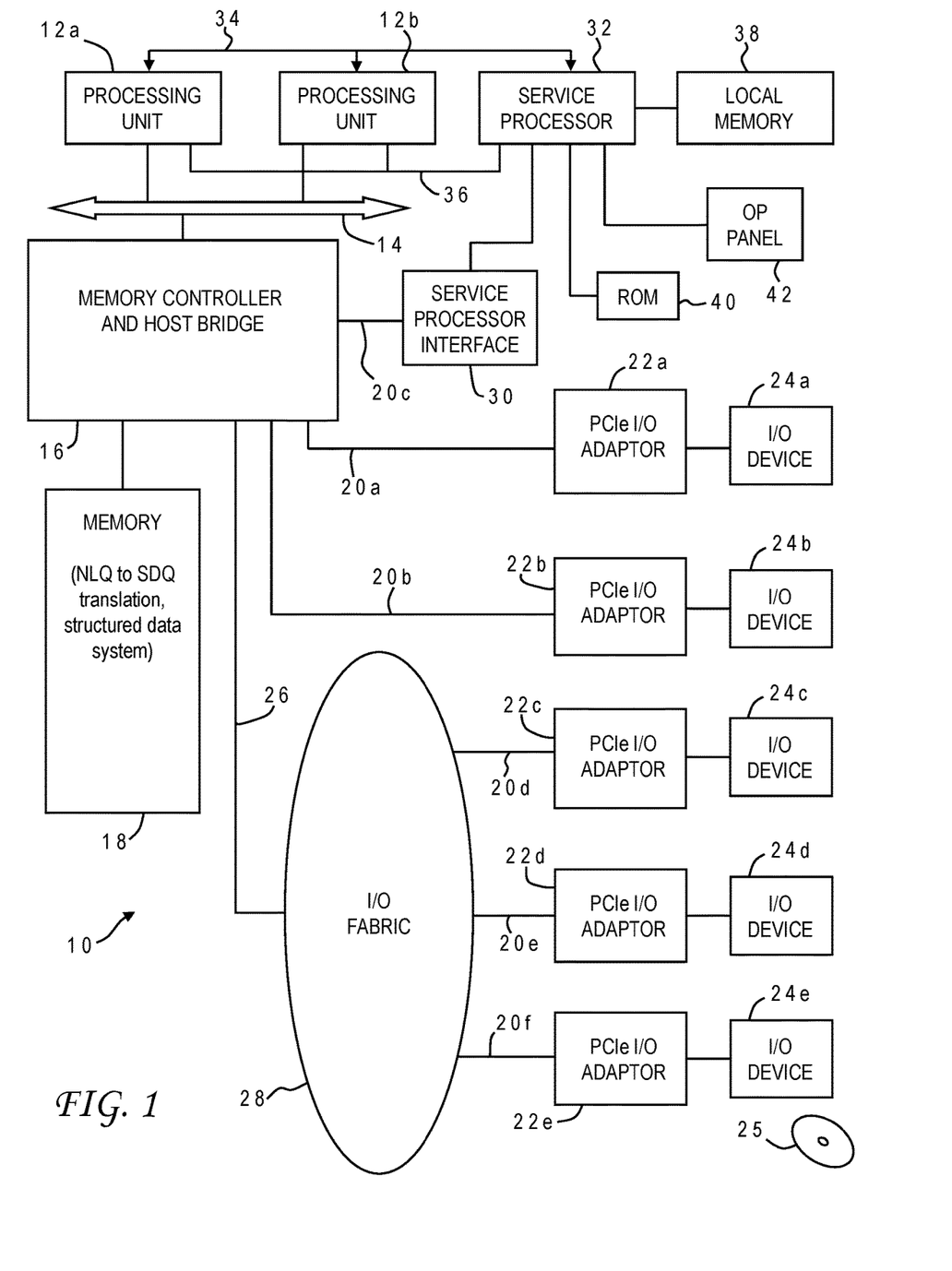
FIG. 1 is a block diagram of a computer system programmed to carry out translation of natural language queries into structured data queries in accordance with one implementation of the present invention.

With reference now to the figures, and in particular with reference to FIG. 1, there is depicted one embodiment 10 of a computer system in which the present invention may be implemented to carry out the translation of natural language queries to structured data queries, and submission of the structured data queries to a structured data system, such as a SQL relational database system. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional features in the memory hierarchy which are not depicted, such as on-board (L1) and second-level (L2) or third-level (L3) caches. System memory 18 has loaded therein a translation application for converting a natural language query (NLQ) to a structured data query (SDQ) in accordance with the present invention. The structured data system (e.g., SQL database) can also reside in system memory 18.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12*a*, 12*b* may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20*c* connects MC/HB 16 to a service processor interface 30 to allow communications between I/O device 24*a* and a service processor 32. Service processor 32 is connected to processors 12*a*, 12*b* via a JTAG interface 34, and uses an attention line 36 which interrupts the operation of processors 12*a*, 12*b*. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12*a*, 12*b* and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12*a*, 12*b* for execution of the program code, e.g., an operating system (OS) which is used to launch applications and in particular the NLQ-to-SDQ translation application of the present invention, results of which may be stored in a hard disk drive of the system (an I/O device 24). While host processors 12*a*, 12*b* are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a structured data query creation process that uses novel analytic techniques to manage natural language (human) queries. Accordingly, a program embodying the invention may include conventional aspects of various natural language processing tools (e.g., speech-to-text converters), and these details will become apparent to those skilled in the art upon reference to this disclosure.

Figure 2:
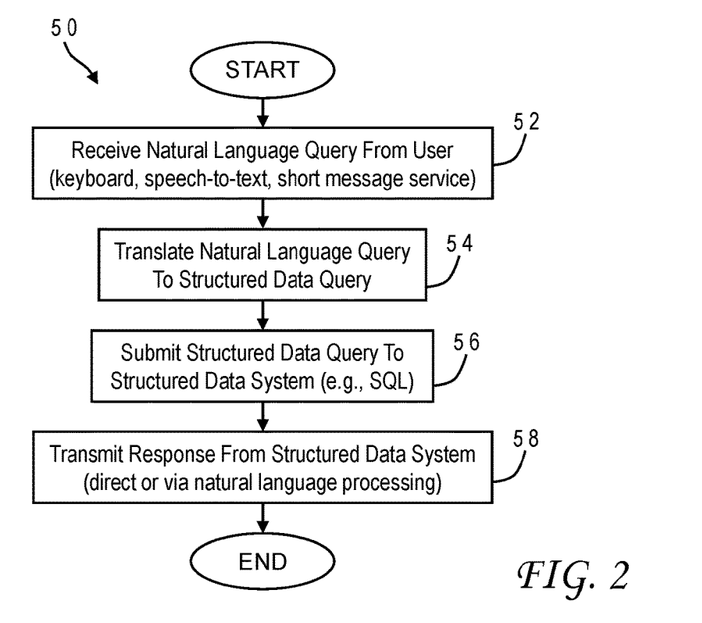
FIG. 2 is a high-level chart illustrating the logical flow for a system to submit natural language queries to a structured data system such as a SQL database in accordance with one implementation of the present invention.

Referring now to FIG. 2, there is depicted a chart illustrating the logical flow executed by an intelligent agent 50 to submit natural language queries to a structured data system in accordance with one implementation of the present invention. Intelligent agent 50 may be running on computer system 10. Intelligent agent 50 begins by receiving the natural language query (NLQ) from a user in computer-readable form (52). The NLQ may be received using any type of user input device, such as entered into a computer or other electronic device via a physical keyboard (or using a touch-screen with a keyboard displayed), sent as a text message (e.g., using the short messaging service SMS), or generated from a vocal utterance which is converted to text. While the vocal utterance may be entered via a computer or mobile device microphone, the invention foresees a ubiquitous AI where any sort of sound detection could be used, such as someone in a board room at a Fortune 500 company simply asking a question out loud and the "room" responding with an answer. For example, a non-technical user (who does not speak structured data programming languages) uses "plainspeak" English to make a business inquiry such as "Can you please tell me the total spent on television in China by IBM in the last quarter of 2015?" This user, a marketing executive, wants a numeric answer right now, for decision support, but no one present with him has this information. However, the answer to this question can be derived from data values stored in a structured data set such as a SQL database which is available to the user. Those skilled in the art will appreciate that SQL is only one of many conventional programming languages which may be used to manage and access structured data. The present invention is equally applicable to other structured data sets and languages, such as hibernate query language, java persistence query language, customized database management languages, and other business intelligence tools. The invention is also not limited to relational databases, but rather is widely applicable to any type of data set that is managed on a computer system using a structured data format for queries.

Returning to FIG. 2, intelligent agent 50 can translate the NLQ to a structured data query (SDQ) which is compatible with the particular structured data system being used (54), as explained further below in conjunction with FIG. 3. The SDQ can then be submitted to the structured data system (56), and the intelligent agent transmits the response from that system back to the user (58). The response may be direct, i.e., in the same form of the output provided by the structured data system (such as exactly "$12,092,001.30"), or optionally provided using natural language processing to reformat the SQL result into a vernacular response (such as "about 12 million dollars").

Figure 3:
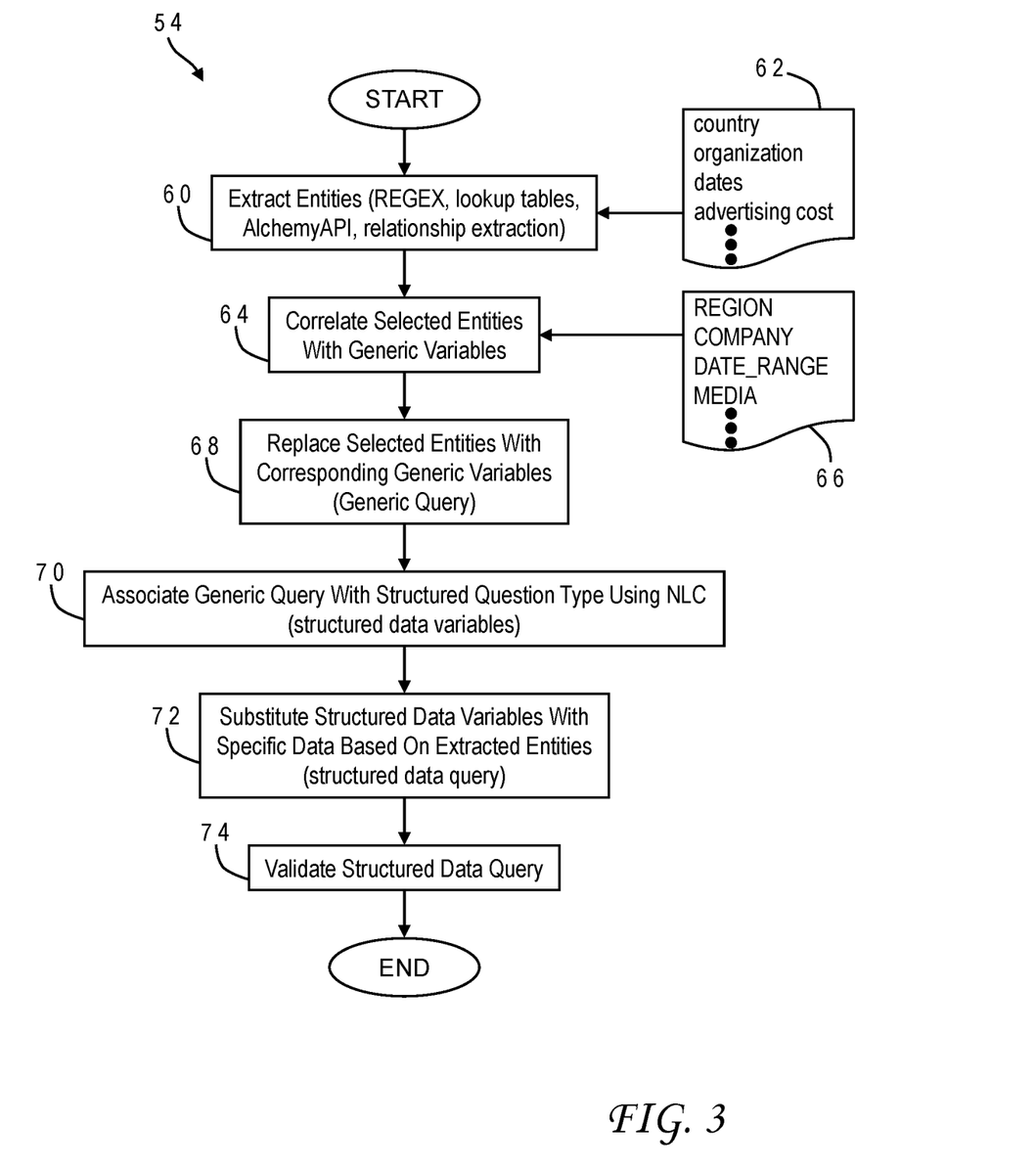
FIG. 3 is a chart illustrating the logical flow for a natural language query translation process in accordance with one implementation of the present invention.

FIG. 3 shows the flow for translating the NLQ into a SDQ in accordance with an illustrative implementation of the present invention. The translation step 54 begins by extracting entities from the NLQ (60). A list 62 of entities which might have corresponding structured data values can be provided by the designer of the intelligent agent. The extracted entities may for example include a country, a person, an organization, a date or date range, various expenditures (costs) or revenues (income), a brand, an industry or business sector, etc. The entities may be extracted according to various approaches including relationship extraction (particularly an advanced system such as AlchemyAPI), lookup tables with associated rules (e.g., a list of 2000 company names and name variations, a list of media types, months of the year, years from 1970 to 2050, a list of countries/regions, etc.), or using regular expressions (REGEX) which are special text strings for describing search patterns. The entities can be extracted using a combination of the foregoing techniques. Selected entities are correlated with generic variables (64). The generic variables can be found in another list 66 provided by the designer. The correlation need not be one-to-one; for example, either a city entity or a country entity could be correlated to a "REGION" generic variable. Generic variables represent labels or value types that may be found in a variety of different structured data sets, i.e., they are more conceptual in nature and not limited to any particular programming language.

Extracted entities found to have corresponding generic variables are then replaced with those variables (68), resulting in a generic query. For example, the word "China" in a NLQ could be replaced by the generic variable "REGION". The generic query may also be simplified by replacing certain natural language phrases with more generic expressions using natural language processing (or just removing phrases that are extraneous to the intent of the query). For example, the prefatory language "Can you please tell me . . . " could be converted to the simpler expression "What was . . . ". This simplification may also involve an extracted entity, e.g., "in the last quarter of <year>" becomes "between DATE1 and DATE2" where DATE1 represents the first day of last the quarter for the noted year and DATE2 represents the last day of the last quarter for the noted year.

The resulting generic query can be associated with a structured question type (70). The structured question type is specific to the particular structured data system/language employed for storing the information, e.g., a SQL statement, and has structured data variables supported by that language. In the preferred implementation, the generic query is associated with the structured question type using one or more natural language classifiers. The use of natural language classifiers has many advantages as discussed further below. A natural language classifier (NLC) can be drafted based on a "ground truth", which may take the form of a comma-separated value (CSV) file. The CSV file maps example queries to SQL shells. FIG. 4 shows a table 80 representing such a CSV file, with simplified queries and corresponding SQL statements. While FIG. 4 shows only nineteen rows, an exemplary ground truth file might have around one thousand entries (questions). The NLC uses these example queries to classify the generic query obtained from the user's NLQ, i.e., the classifications are the structured question types. The NLC may in particular be provided by the IBM Watson™ natural language classifier service.

Returning to FIG. 3, one the proper structured question type is found, specific data is substituted for the structured data variables in the question type based on the extracted entities to generate the structured data query (72). The structured data variables correspond to specific generic variables which in turn correspond to the extracted entities so it is easy for the intelligent agent running on computer system 10 to maintain a hook for each structured data variable back to its respective entity. For example, the structured question type could include a "COUNTRY" structured variable corresponding to the extracted entity "China", so the final structured data query (SQL shell) would include the parameter "COUNTRY='China'". After this re-insertion of data, the final query is preferably validated against a syntax rules engine before being submitted to the database (74). This check will confirm that no syntax errors exist and stop any dangerous/excessive queries (query safety).

Figure 5:
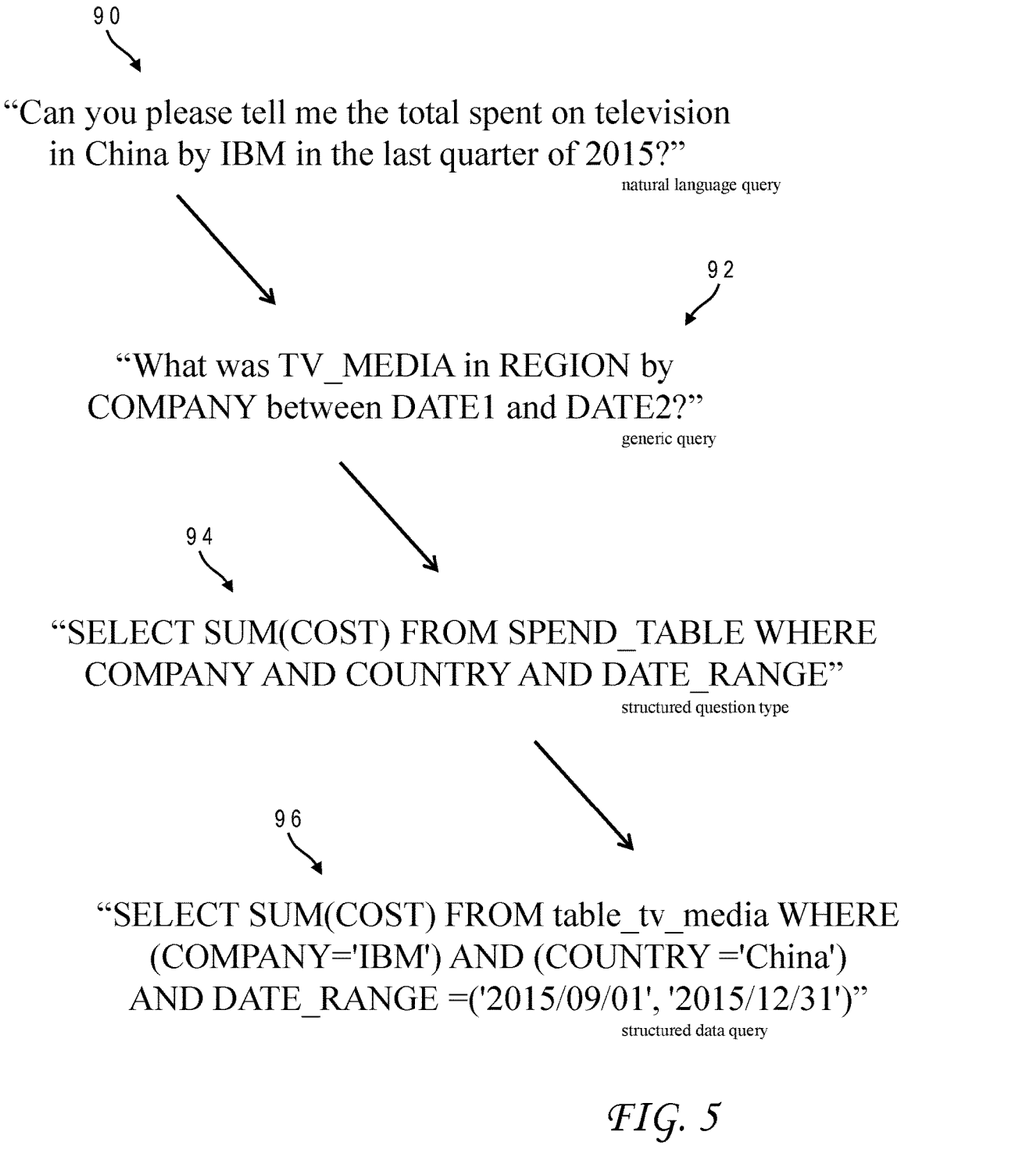
FIG. 5 is a pictorial representation of the evolution of a natural language query to a generic query, then to a structured question type, and finally to a structured data query in accordance with one implementation of the present invention.

FIG. 5 gives an example of how a NLQ 90 evolves during the translation process to a SDQ 96. This example is based on the previous NLQ "Can you please tell me the total spent on television in China by IBM in the last quarter of 2015?" NLQ 90 is first simplified to yield the generic query 92: "What was TV_MEDIA in REGION by COMPANY between DATE1 and DATE2?" Generic query 92 is not specific to any programming language, but rather is broadly conceptual. A natural language classifier associates generic query 92 with structural question type 94: "SELECT SUM (COST) FROM SPEND_TABLE WHERE COMPANY AND COUNTRY AND DATE_RANGE". The system being interrogated uses a SQL database to store the relevant information (tv media), so the natural language classifier uses a ground truth customized to SQL, and structural question type 94 is specific to SQL, i.e., it is a SQL shell. Finally, the specific data from the original NLQ 90 is inserted into the shell to generate the structured data query 96: "SELECT SUM(COST) FROM table_tv_media WHERE (COMPANY='IBM') AND (COUNTRY= 'China') AND DATE_RANGE=('2015/09/01', '2015/12/ 31')". This specific SDQ can then be submitted to the SQL system.

As noted above, there are many advantages to using NLCs for finding the right structural question type. One is intent identification. The present invention can exploit this capability of NLCs to highlight the main objective of every query as well as emphasize other entities that would be specific to the given domain. A key factor when developing a natural language to structured language system is the confidence around delivering highly reliable responses; the NLC pipeline enables just that, making it very convenient to extract as many specific entities (people, places, companies, brands, dates) while retaining the primary objective of finding the query type. This unique ability enables the present invention to emphasize custom entities specific to domain as opposed to the simplistic tagging of specific entities as in conventional literature. This customization in turn can render results with higher confidence and accuracy. The present invention can also leverage NLC's ability around response formatting, allowing answers to be rendered through varied visualizations like a single number response. For instance, the phrase "Sales in 2015" could be presented in a purely text format but the phrase "Sales by month in 2015" can be tagged to a default graphical format making it feasible to showcase this depiction through a bar chart over 12 months. This ability to furnish results in accordance with the question type makes it flexible, for instance, to provide results by either querying SQL or linking in retrieve-and-rank systems as described below in conjunction with FIG. 6, adding significantly to the capability as a nuanced natural language to structured language conversion framework. NLCs further help with refining associated intent given their thorough intent gathering.

Figure 6:
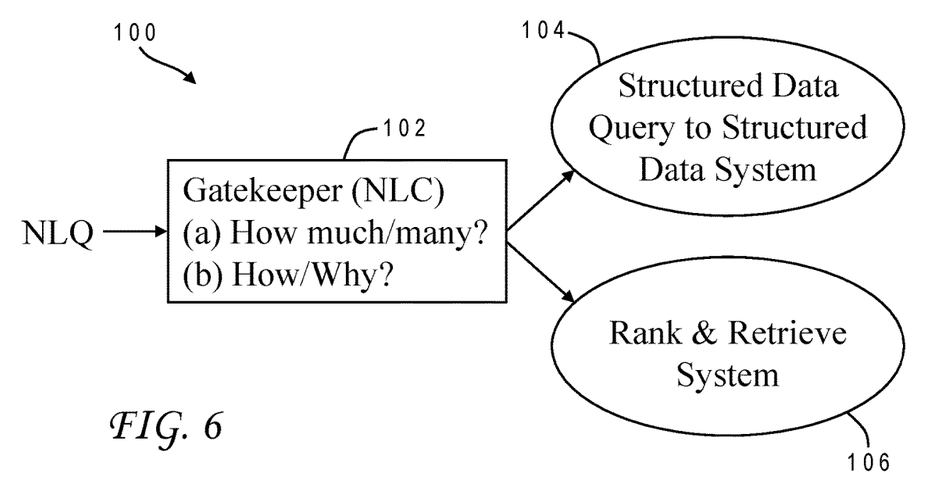
FIG. 6 is a high-level block diagram depicting a natural language classifier (NLC) used as a gatekeeper to selectively direct a natural language query to either a rank-and-retrieve system or a structured data system in accordance with one implementation of the present invention.

An NLC can also be useful as a "gatekeeper" to effectively understand whether a user's intent is to get a discrete number (like a sales sum) which would come from a structured data system or instead to get a textual response from an alternate source (corpus). One embodiment 100 of this application is seen in FIG. 6. The gatekeeper NLC 102 receives the natural language query and determines whether it is more of a "How much/many" question or a "How/Why" question. The first question class is structured/discrete, such as "Total Sales", "How much revenue", "How many people", or "Growth rate". The latter question class is unstructured/textual, such as "What are best practices for marketing in Asia", "what factors drive X outcome", or "What are top risks for . . . ". If the question is of a structured nature, gatekeeper 102 generates a structured data query as previously described and submits it to the structured data system 104. Alternatively, if the question is textual in nature, an optimized query can be sent to a rank-and-retrieve system 106 which uses an alternate corpus of data such as a SOLR data set. SOLR is an enterprise search engine that can run as a standalone full-text search server. This approach allows for the effective translation of plain-spoken intents and questions to responsive business intelligence systems.

The present invention can additionally leverage the flexibility of NLCs as a service, by using multiple NLCs in various capacities to pick the best structured question type.

Multiple NLCs can be trained on different ground truths and used in an ensemble approach for better accuracy. If multiple NLCs disagree about the proper query type, rules can be developed to consider the outlier. For example, if there is a majority (or winning plurality) of the NLCs agreeing on an answer, that answer can be used, and the minority answer(s) ignored. Specialized NLCs can also be employed. For example, one generalized English-to-SDQ NLC may exist, but another may exist that is optimized for a certain type of data structure, e.g., SQL. In this case, both or several can be used together, and provide higher confidence while covering more types of utterances. A specialized NLC may be given extra weight in a decision (without having absolute authority over the decision), e.g., if no NLCs agree then the specialized NLC response is used, but if only two other NLCs agree then their answer overrules that of the specialized NLC. Other factors can be used to establish different confidence values for the various answers. The NLC ground truth, once optimized for the basic and standard queries, can further be expanded to cover comparative queries (compare or contrast), or even switch to a secondary NLC that is optimized only for "A" vs "B" scenarios, e.g. "What was Coke's revenue growth from 2005 to 2015 compared to Pepsi?" In situations where there is no clear winning answer among multiple NLCs (or below some low confidence threshold predetermined by the system designer) the intelligent agent can deal with the uncertainty by making a request for the user to clarify or disambiguate the query—possibly by allowing the user to select from a subset of answers. This outcome may optionally cause an accrual of the information and a signal that the NLC ground truth should be re-trained to better handle utterances of this type.

Figure 7:
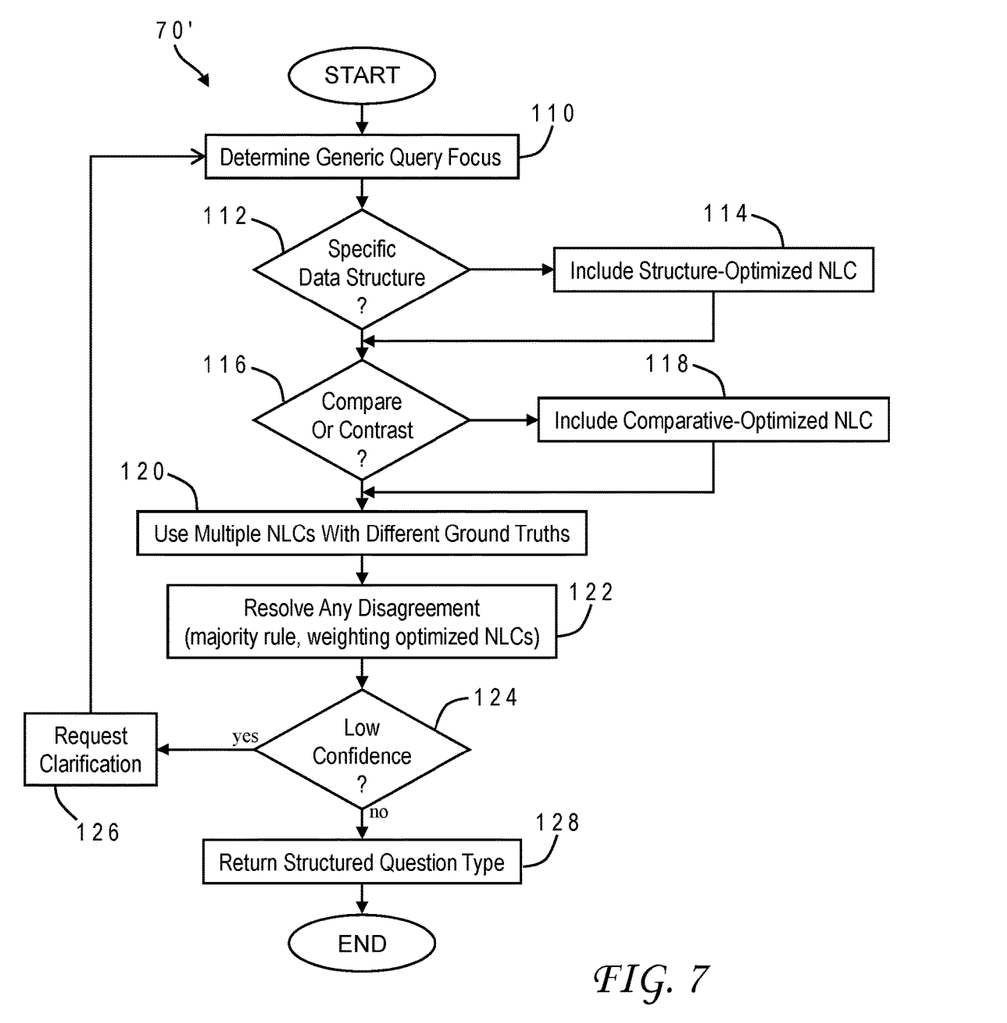
FIG. 7 is a chart illustrating the logical flow for a process which associates a generic query with a structured question type using multiple NLCs in accordance with one implementation of the present invention.

These ensemble approaches are reflected in the chart of FIG. 7 which illustrates the logical flow for a process 70' which uses multiple NLCs to associate a generic query with a structured question type in accordance with one implementation of the present invention. Process 70' begins by determining a focus of the generic query (110), by considering such circumstances as the language of the structured data set to be interrogated or the semantic nature of the generic query. If the generic query alludes to a specific data structure (112), then a NLC optimized for that structure (e.g., SQL) can be included in the NLC ensemble (114). If the query is comparative (116), then a comparative-optimized NLC can be included in the NLC ensemble (118). The selected NLCs, along with others having different ground truths, are used to generate candidate question types (120). Any disagreement between the NLCs can be resolved as discussed above (122). If the best answer is still low confidence (124), the intelligent agent can ask for clarification of the query (126), and the process returns to box 110. Any sufficiently high confidence answer is returned as the structured question type (128).

Over time, other data and signals will emerge that can help improve system performance beyond the NLC ground truth. For example, some kinds of NLC classes will be returned more often than others; users will spend more time on certain results than others (page view duration); some results will be requested to be forwarded; and some users with known attributes ("Sally from Sales") will be more likely to want sales data vs. operational cost data. These signals can be multipliers, i.e., they can boost (or de-boost) class confidence scores.

The present invention thereby provides a superior interface for natural language queries which closely follows user intent while providing highly reliable data from structured sources. The invention is applicable to a variety of system configurations, programming languages and frameworks, and can deliver exceptional real-time decision support.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been disclosed in the context of English as the natural language base, but it is of course applicable to other human languages and dialects, as well as specialized (e.g., technical) vocabularies. It is therefore contemplated that such modifications can be made without departing from the spirit or scope of the present invention as defined in the appended claims.

What is claimed is:

1. A method of translating a natural language query to a structured data query comprising:

receiving the natural language query from a user in computer-readable form, by executing first instructions in a computer system;

extracting one or more entities from the natural language query, by executing second instructions in the computer system;

correlating at least one of the entities with a generic variable selected from a list of available generic variables, by executing third instructions in the computer system;

replacing the at least one entity in the natural language query with the generic variable to generate a generic query, by executing fourth instructions in the computer system;

associating the generic query with a structured question type which includes a structured data variable corresponding to the generic variable, by executing fifth instructions in the computer system;

inserting specific data in the structured question type in relation to the structured data variable based on the at least one entity to form the structured data query, by executing sixth instructions in the computer system;

submitting the structured data query to the structured data system, by executing seventh instructions in the computer system; and providing a natural language response to the user from the structured data system, by executing seventh instructions in the computer system.

2. The method of claim 1 wherein said associating is carried out using a natural language classifier which classifies the generic query according to different structured question types.

3. The method of claim 1 wherein the generic variable is selected from the group consisting of a region, a company, a date range, and a spend amount.

4. The method of claim 1 further comprising determining whether the natural language query is directed to a structured data system or a rank-and-retrieve system.

5. The method of claim 1 wherein the structured question type is a SQL shell.

6. The method of claim 1 further comprising validating the structured data query to confirm that the structured data query complies with syntax requirements of a structured data system.

7. A computer system comprising:

one or more processors which process program instructions;

a memory device connected to said one or more processors; and program instructions residing in said memory device for translating a natural language query to a structured data query by receiving the natural language query from a user in computer-readable form, extracting one or more entities from the natural language query, correlating at least one of the entities with a generic variable selected from a list of available generic variables, replacing the at least one entity in the natural language query with the generic variable to generate a generic query, associating the generic query with a structured question type which includes a structured data variable corresponding to the generic variable, and inserting specific data in the structured question type in relation to the structured data variable based on the at least one entity to form the structured data query, submitting the structured data query to the structured data system, and providing a natural language response to the user from the structured data system.

8. The computer system of claim 7 wherein the associating is carried out using a natural language classifier which classifies the generic query according to different structured question types.

9. The computer system of claim 7 wherein the generic variable is selected from the group consisting of a region, a company, a date range, and a spend amount.

10. The computer system of claim 7 wherein said program instructions further determine whether the natural language query is directed to a structured data system or a rank-and-retrieve system.

11. The computer system of claim 7 wherein the structured question type is a SQL shell.

12. The computer system of claim 7 wherein said program instructions further validate the structured data query to confirm that the structured data query complies with syntax requirements of a structured data system.

13. A computer program product comprising:
a computer readable storage medium; and
program instructions residing in said storage medium for translating a natural language query to a structured data query by receiving the natural language query from a user in computer-readable form, extracting one or more entities from the natural language query, correlating at least one of the entities with a generic variable selected from a list of available generic variables, replacing the at least one entity in the natural language query with the generic variable to generate a generic query, associating the generic query with a structured question type which includes a structured data variable corresponding to the generic variable, and inserting specific data in the structured question type in relation to the structured data variable based on the at least one entity to form the structured data query, submitting the structured data query to the structured data system, and providing a natural language response to the user from the structured data system.

14. The computer program product of claim 13 wherein the associating is carried out using a natural language classifier which classifies the generic query according to different structured question types.

15. The computer program product of claim 13 wherein the generic variable is selected from the group consisting of a region, a company, a date range, and a spend amount.

16. The computer program product of claim 13 wherein said program instructions further determine whether the natural language query is directed to a structured data system or a rank-and-retrieve system.

17. The computer program product of claim 13 wherein the structured question type is a SQL shell.

18. The computer program product of claim 13 wherein said program instructions further validate the structured data query to confirm that the structured data query complies with syntax requirements of a structured data system.

* * * * *